United States Patent
Dunn et al.

(10) Patent No.: US 9,600,405 B1
(45) Date of Patent: Mar. 21, 2017

(54) SYSTEMS AND METHODS FOR TESTING A SOFTWARE APPLICATION

(71) Applicant: FEDERAL HOME LOAN MORTGAGE CORPORATION, Mclean, VA (US)

(72) Inventors: Philip Dunn, Vienna, VA (US); Yi Liu, Rockville, MD (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

(21) Appl. No.: 15/209,551

(22) Filed: Jul. 13, 2016

Related U.S. Application Data

(63) Continuation of application No. 14/804,586, filed on Jul. 21, 2015, now Pat. No. 9,405,667, which is a continuation of application No. 12/573,680, filed on Oct. 5, 2009, now Pat. No. 9,111,030.

(60) Provisional application No. 61/102,737, filed on Oct. 3, 2008.

(51) Int. Cl.
G06F 9/44 (2006.01)
G06F 11/36 (2006.01)
G06F 17/30 (2006.01)

(52) U.S. Cl.
CPC ...... G06F 11/3692 (2013.01); G06F 11/3684 (2013.01); G06F 11/3688 (2013.01); G06F 17/30528 (2013.01); G06F 17/30554 (2013.01)

(58) Field of Classification Search
None
See application file for complete search history.

(56) References Cited

U.S. PATENT DOCUMENTS

| 6,519,763 | B1 | 2/2003 | Kaufer et al. |
| 7,010,454 | B1 | 3/2006 | Potter et al. |
| 7,054,881 | B2 * | 5/2006 | Arcand .......... G01R 31/318307 707/687 |
| 7,191,163 | B2 * | 3/2007 | Herrera ................. G06N 5/046 706/45 |

(Continued)

OTHER PUBLICATIONS

University of Cambridge, "CCPN Software", Dec. 15, 2007, pp. 1-2, [on-line], [retrieved on Nov. 28, 2012], Retrieved from, <http://www.ccpn.ac.uk/software/extras/memops/strategydocs/xmlfilesnames>.

*Primary Examiner* — Evral E Bodden
(74) *Attorney, Agent, or Firm* — Finnegan, Henderson, Farabow, Garrett & Dunner LLP

(57) ABSTRACT

Systems, methods, and computer-readable media are disclosed for testing a software application. An exemplary method includes storing a control file identifying a test case for testing a software application. A first expected result may be extracted from a device storing expected results of the software application, the first expected result being identified by the control file. A first actual result may be extracted from a device storing actual results output by the software application, the first actual result being identified by the control file. The first expected result may be compared with the first actual result to determine whether the first actual result matches the first expected result. A result file indicating whether the test case passed or failed is generated, and the test case has passed when the first actual result matches the first expected result. The result file may be stored in a storage device.

21 Claims, 10 Drawing Sheets

(56) References Cited

U.S. PATENT DOCUMENTS

| | | |
|---|---|---|
| 7,197,542 B2 * | 3/2007 | Ponzio, Jr. .......... G06F 11/3006 707/999.001 |
| 7,340,725 B1 | 3/2008 | Robinson et al. |
| 7,373,636 B2 | 5/2008 | Barry et al. |
| 7,792,950 B2 * | 9/2010 | Barsness ............. G06F 11/3466 709/224 |
| 8,195,983 B2 | 6/2012 | Celeskey et al. |
| 8,572,568 B2 | 10/2013 | Giat |
| 2002/0007423 A1 * | 1/2002 | Arao ....................... G06F 9/546 719/318 |
| 2003/0229825 A1 * | 12/2003 | Barry .................. G06F 11/3688 714/38.14 |
| 2004/0128653 A1 | 7/2004 | Arcand |
| 2006/0123389 A1 * | 6/2006 | Kolawa ............... G06F 11/3616 717/101 |
| 2007/0116234 A1 * | 5/2007 | Schneider ............... H04M 3/58 379/219 |
| 2008/0028288 A1 * | 1/2008 | Vayssiere .............. G06F 17/246 715/219 |
| 2010/0100872 A1 | 4/2010 | Mitra |
| 2012/0144373 A1 | 6/2012 | Cook |

\* cited by examiner

| | Text | Calendar Date |
|---|---|---|
| Loan1 | A | 1/10/2005 |
| Loan2 | B | 1/10/2005 |
| Loan3 | C | 1/10/2005 |
| Loan4 | A | 1/10/2005 |
| Loan5 | B | 1/10/2005 |
| Loan6 | C | 1/10/2005 |

Actual Results Spreadsheet 134

FIG. 3

| Test Case ID 401 | Verification ID 402 | Description 403 |
|---|---|---|
| 31117 | Verification1 | Verify "text" column matches db_text |
| 31118 | Verification2 | Verify "calendar date" column matches db_calendardate |
| 31119 | Verification3 | Verify column x3, row y3 == dbvalue3 |
| 31120 | Verification3 | Verify column x3, row y3 == dbvalue3 |
| 31121 | Verification4 | Verify column x4, row y4 == dbvalue4 |
|  | Verification5 | Verify column x4, row y4 <= 1,000,000 |
| 31122 | Verification6 | Verify column x5, row y5 == 27 |
| 31123 | Verification7 | Verify column x6, row y6 == dbvalue5 | test case list file 115-1

FIG. 4

```
# defined variables
date=2005-01-10
run_id=1
to be referenced in SQL as @date and @run_id list of test control files to be run
testcases=config1.ctl directory structure
prog.dir=C:\testmatch
ctl.dir=${prog.dir}\ctl
sql.dir=${prog.dir}\sql
data.dir=${prog.dir}\data
input.dir=${data.dir}\input
output.dir=${data.dir}\output
log.dir=${data.dir}\log
```

Configuration file 113-1

FIG. 5

```
config1.ctl - Notepad
File Edit Format View Help
testcase= Data_drop
prepartion= drop_tds_delete_table.sql
preparation.db= tds
=================================================================
testcase= Data_drop
prepartion= drop_cdw_delete_table.sql
preparation.db= cdw
=================================================================
testcase= Data_preparation
preparation= tds_delete_table.sql
preparation.db= tds
=================================================================
testcase= Data_preparation
preparation= cdw_delete_table.sql
preparation.db= cdw
=================================================================
testcase= 31117+31118 header= Text.Calendar Date expected.type= DATABASE
actual.type= EXCEL data.blocks= 1
tolerance = .01 expected.db= TDS
expected.query=
select a.text, a.calendar_date
from delete.testmatch_tds a
where a.calendar_date = '@date'        ⎤  ─601 actual.file= Testmatch_QueryTest.xls actual.block.1.header= Text,Calendar Date  ⎤  ─602
actual.block.1.collist= x1, y1
=================================================================
                    Control file 114-1
```

FIG. 6

Summary Report

| Test Case Count | Test Case ID 801 Summary Report Detail section | Output Result File Count | Test Result File Name 802 | Test Result Creation Time 803 | Detail 804 |
|---|---|---|---|---|---|
| 1 | 31117 | 1 | 31117+31118.20080619.103404_PASS.html | 06/19/2008 10:34:04 AM | Verification1: Verify "text" column matches db_text |
| 2 | 31118 | | | | Verification2: Verify "calendar date" column matches db_calendardate CU |
| 3 | 31119 | 2 | 31119.20080619.103407_PASS.html | 06/19/2008 10:34:05 AM | Verification 3: Verify column x3, row y3 == dbvalue3 |
| 4 | 31120 | 3 | 31120.20080619.103408_PASS.html | 06/19/2008 10:34:07 AM | Verification 3: Verify column x3, row y3 == dbvalue3 |
| 5 | 31121 | 4 | 31121.20080619.103410_PASS.HTML | 06/19/2008 10:34:08 AM | Verification 4: Verify column x4, row y4 == dbvalue 4 |
| | | | | 06/19/2008 | Verification5: Verify column x4, row y4 <= 1,000,000 |

Listing of Unexecuted Test Cases 900

| (n) Category | Description |
|---|---|
| Loans | 31122=Verify column x5, row y5 == 27 |
| Loans | 31123=Verify column x6, row y6 == dbvalue5 |
|  |  |

FIG. 9A

Test Result Summary 950
06/23/2008 02:34:34 PM

| Summary | Count |
|---|---|
| Total Test Cases | 1744 |
| Passed | 54 |
| Failed/Warning | 2 |
| Unexecuted | 1685 |
| Total Result Files | 85 |
| Passed | 55 |
| Failed/Warning | 5 |
| Misnamed/Unknown | 25 |

FIG. 9B

|  | Text | Calendar Date |
|---|---|---|
| Loan1 | PASS(Actual = A, expected = A) | PASS (Actual = 1/10/2005, expected = 1/10/2005) |
| Loan2 | PASS(Actual = B, expected = B) | PASS (Actual = 1/10/2005, expected = 1/10/2005) |
| Loan3 | PASS(Actual = C, expected = C) | PASS (Actual = 1/10/2005, expected = 1/10/2005) |
| Loan4 | PASS(Actual = A, expected = A) | PASS (Actual = 1/10/2005, expected = 1/10/2005) |
| Loan5 | PASS(Actual = B, expected = B) | PASS (Actual = 1/10/2005, expected = 1/10/2005) |
| Loan6 | PASS(Actual = C, expected = C) | PASS (Actual = 1/10/2005, expected = 1/10/2005) |

Spreadsheet Output Report 1000

FIG. 10

SYSTEMS AND METHODS FOR TESTING A SOFTWARE APPLICATION

CROSS REFERENCE TO RELATED APPLICATION(S)

This application is a continuation of U.S. patent application Ser. No. 14/804,586 filed Jul. 21, 2015, which is a continuation of U.S. patent application Ser. No. 12/573,680 filed Oct. 5, 2009 (issued as U.S. Pat. No. 9,111,030), which claims the benefit of priority from U.S. Provisional Application No. 61/102,737, entitled "SYSTEMS AND METHODS FOR TESTING A SOFTWARE APPLICATION," filed Oct. 3, 2008. The content of each of the above-referenced applications is expressly incorporated herein by reference to its entirety.

TECHNICAL FIELD

The present invention generally relates to the field of computer software. More particularly, and without limitation, the invention relates to systems and methods for testing software applications.

BACKGROUND INFORMATION

Organizations spend a great deal of resources testing their products. For example, a software company will often create a number of dedicated tests and apply them to each new iteration of a software product. The software product will only be released upon passing each of the tests.

In many cases, these dedicated tests consist of custom scripts written in scripting languages such as Perl and Javascript. Thus, the personnel within the organization who perform the software testing are required to know the scripting language in order to effectively carry out their jobs. Moreover, as the testing scripts are customized to the program being tested, a significant amount of development effort goes into creating each of the tests.

Therefore, it would be advantageous to provide a generalized testing system and method that would allow users to test a software application without knowing how to program in a scripting language. Further, it would be advantageous to reduce the amount of time required to test a software application by providing a simple, generic format for developing and executing test.

SUMMARY

Consistent with embodiments of the invention, computer-implemented methods, a computer system, and a computer-readable medium are provided.

A computer-implemented method may include storing a control file identifying a test case for testing a software application; extracting, from a device storing expected results of the software application, a first expected result, the first expected result being identified by the control file; extracting, from a device storing actual results output by the software application, a first actual result, the first actual result being identified by the control file; comparing the first expected result with the first actual result to determine whether the first actual result matches the first expected result; generating a result file indicating whether the test case passed or failed, the test case having passed when the first actual result matches the first expected result; and storing the result file in a storage device.

A computer-readable medium may include instructions for causing a processor to execute a method for testing a software application. The method may include: storing a control file identifying a test case for testing a software application; extracting, from a device storing expected results of the software application, a first expected result, the first expected result being identified by the control file; extracting, from a device storing actual results output by the software application, a first actual result, the first actual result being identified by the control file; comparing the first expected result with the first actual result to determine whether the first actual result matches the first expected result; generating a result file indicating whether the test case passed or failed, the test case having passed when the first actual result matches the first expected result; and storing the result file in a storage device.

A system may include at least one memory comprising instructions to: store a control file identifying a test case for testing a software application; extract, from a device storing expected results of the software application, a first expected result, the first expected result being identified by the control file; extract, from a device storing actual results output by the software application, a first actual result, the first actual result being identified by the control file; compare the first expected result with the first actual result to determine whether the first actual result matches the first expected result; generate a result file indicating whether the test case passed or failed, the test case having passed when the first actual result matches the first expected result; and store the result file in a storage device. The system may further include at least one processor that executes the instructions.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3 illustrates an exemplary spreadsheet, consistent with certain embodiments of the invention.

FIG. 4 illustrates an exemplary file, consistent with certain embodiments of the invention.

FIG. 5 illustrates an exemplary file, consistent with certain embodiments of the invention.

FIG. 6 illustrates an exemplary file, consistent with certain embodiments of the invention.

FIG. 8 illustrates an exemplary report, consistent with certain embodiments of the invention.

FIG. 9A illustrates an exemplary report, consistent with certain embodiments of the invention.

FIG. 9B illustrates an exemplary report, consistent with certain embodiments of the invention.

FIG. 10 illustrates an exemplary report, consistent with certain embodiments of the invention.

DETAILED DESCRIPTION

Figure 1:
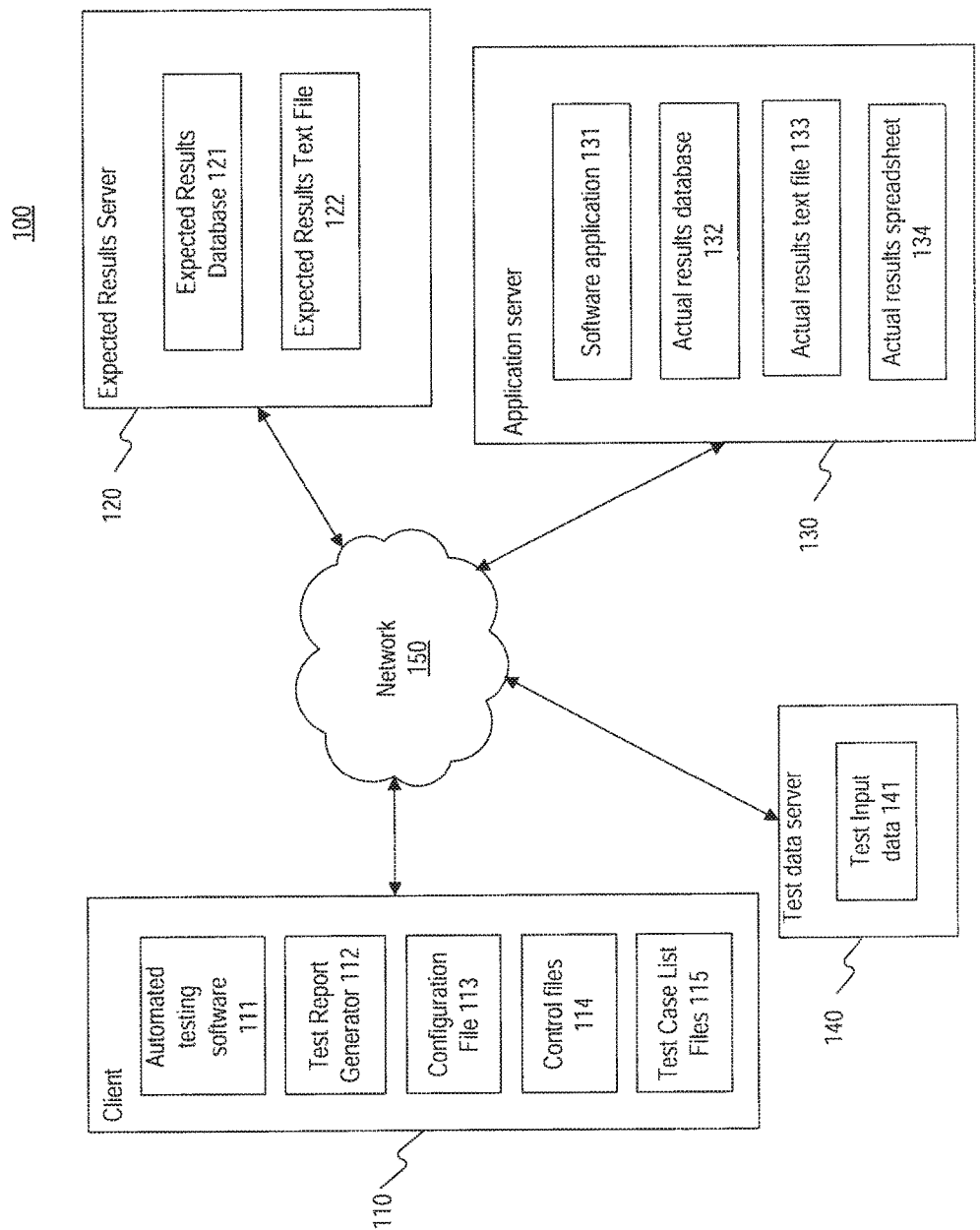
FIG. 1 is a block diagram of an exemplary system, consistent with certain embodiments of the invention.

Reference will now be made in detail to the exemplary embodiments of the invention, examples of which are illus- FIG. 1 illustrates an exemplary computing system 100 for providing testing of a software application 131. In the embodiment shown, client 110 includes automated testing software 111, which executes a number of test cases. The test cases may be identified in one or more test case list files 115. Each test case can be identified for execution by automated testing software 111 in one or more control files 114. Control files 114 may be text files, or other data files, that specify data for comparing to determine whether a software application 131 passes a given test case. For example, the software application being tested may output a file, and control files 114 may specify data contained in the output file that should match certain expected results. In this way, automated testing software 111 can verify that software application 131 performs as expected, by storing the correct data in the correct locations of the output file. By using control files 114 to specify the data for comparison, the user does not need to know a specific programming language to perform testing of software application 111.

Automated testing software 111 on client 110 can be a Java program that implements JDBC (Java database connectivity) to access test results in database format. Automated testing software 111 can use Apache POI API's to access, manipulate, and create spreadsheets. Test report generator 112 may also be a Java program that implements JDBC and Apache POI. Test report generator 112 may generate various reports reflecting the testing progress of the software application, as discussed in more detail below.

In the embodiment shown, software application 131 is being tested, and resides on application server 130. Software application 131 may retrieve test input data 141 from test data server 140, perform processing on test input data 141, and create a data file as an output. Depending on the application or user-specified configuration settings, software application 131 may output the data file in various formats, such as SQL statements used to populate an actual results database 132, an actual results text file 133, or an actual results spreadsheet 134. An exemplary actual results spreadsheet 134 is shown in FIG. 3

The output results from software application 131 will be compared to some known good results for the same test input data 141. In some embodiments, system 100 provides a framework for emulating software application 131 to generate the known good results. These known good results are stored on expected results server 120 in different formats, such as an expected results database 121, or an expected results text file 122. The expected results could be, for example, results generated by a previously released version of the application being tested. Once the tests are executed, test report generator 112 on client 110 will compare the actual outputs on application server 130 with the expected results on expected results server 120, and provide a user at client 110 with the results of the test and various reports that summarize data about the test results.

The system 100 shown in FIG. 1 is an example of one embodiment consistent with the invention, and it may have parts, connections, control flows, or data flows added, deleted, reordered, or modified without departing from principles of the invention. For example, the functions of devices 110, 120, 130, and 140 could be combined into a single computer, such as a server, without departing from principles of the invention. One of ordinary skill will recognize that embodiments of the invention may be implemented by computers or workstations organized as shown, organized in a distributed processing system architecture, or organized in myriad suitable combinations of software, hardware, and/or firmware.

Each of the illustrated machines, for example, client 110, expected results server 120, application server 130, and test data server 140, can be a general-purpose computer. Each can include a CPU, a memory, various I/O devices, and permanent storage such as a hard drive, flash drive, or optical drive. Network 150 may be any suitable means of communication between the various machines. For example, network 150 could be a wired or wireless network, or any combination thereof. Network 150 could be an open public network such as the Internet, or a closed private network, or any combination thereof. The features of the various components of the machines shown in FIG. 1 can be implemented as instructions on computer-readable storage media. For example, automated testing software 111 could be stored on an optical disc as programming instructions for execution by a CPU in client 110. The disc could be read by client 110, the instructions stored in a hard drive and in memory, and executed by a CPU of client 110. The other components shown in FIG. 1 can be implemented in a similar fashion on their respective machines.

Figure 2:
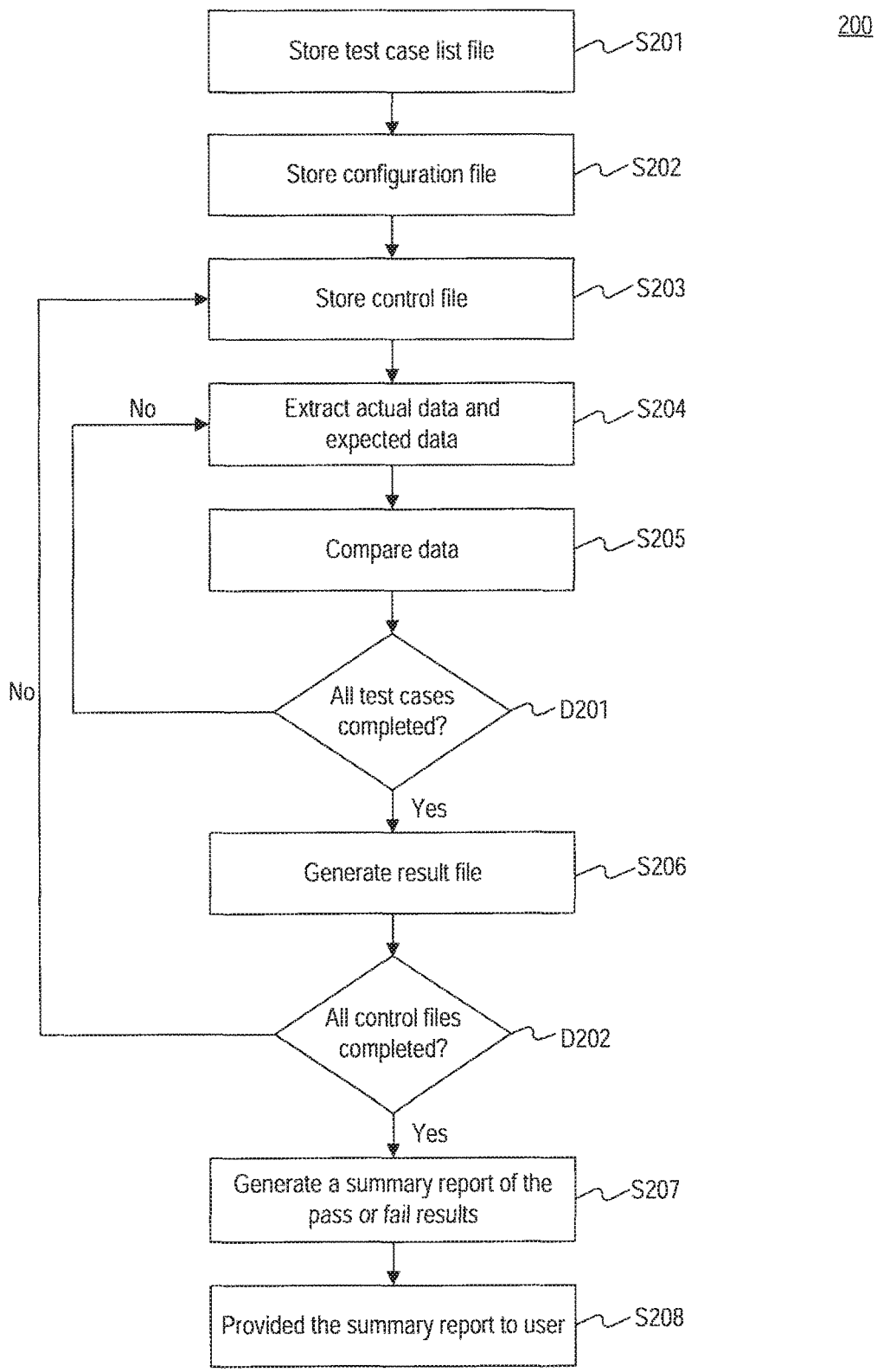
FIG. 2 is a flowchart of an exemplary method, consistent with certain embodiments of the invention.

Using exemplary computing system 100, it is possible to implement a method for testing a software application. An exemplary method 200 for testing a software application is shown in FIG. 2. Before method 200 begins, software application 131 processes test input data 141 to output a spreadsheet, and stores the spreadsheet on application server 130 as actual results spreadsheet 134.

At step S201, the developer of software application 131 may create and store a test case list file 115-1 on client 110, as shown in FIG. 4. Test case list file 115-1 may include a test case ID column 401, verification ID column 402, and description column 403. Test case ID column 401 may include test case identifiers which uniquely identify certain "test cases," or data comparisons, for execution by automated testing software 111. Verification ID column 402 may include verification identifiers which identify verification points for software application 131.

Each verification point may have a corresponding textual description reflected in description column 403. For example, as illustrated in FIG. 4, verification1 states that software application 131 is expected to populate a column of a spreadsheet labeled "text" with a value equal to db_text. The term db_text may represent a value in expected results database 121. Similarly, verification2 states that software application 131 is expected to populate a column of the spreadsheet labeled "calendar date" with a value equal to db_calendardate. The term db_calendardate may represent another value in expected results database 121.

The verification points may be specified by the designer of software application 131 during a design or requirements phase of application development, and may be identified by their corresponding verification IDs 402 in an engineering document (not shown) such as a requirements document, design document, test plan, etc. Each verification ID 402 may be automatically extracted from the engineering document by automated testing software 111, along with the corresponding text description. In some embodiments, automated testing software 111 may use verification IDs 402 instead of test case IDs 401 to identify data comparisons or test results. For example, test case IDs 401 or verification IDs 402 may be mapped to result files, as discussed in more detail below. For the sake of clarity, test case IDs 401 will be used for the examples discussed herein.

At step S202, a user, such as a test engineer or the application developer, generates and stores a configuration file 113-1 on client 110, as shown in FIG. 5. Configuration file 113-1 may specify a directory where a number of different control files 114 may be found. By changing various data in configuration file 113-1, the user may specify different directories where control files 114 for testing software application 131 are located. Configuration file 113-1 may also specify which control files 114 the user would like to execute. For example, as shown in FIG. 5, the user may specify that a single control file named "config1.ctl" should be executed by assigning the string "config1.ctl" to a variable "testcases." In some embodiments, automated testing software 111 automatically executes all control files 114 in a particular directory or directory tree. Automated testing software 111 may identify any file with an extension of ".ctl" as a control file.

At step S203, the user generates and stores a control file 114-1, entitled "config1.ctl," on client 110, as shown in FIG. 6. Control file 114-1 may be used to execute one or more of the test cases identified in test case list file 115-1. As shown, control file 114-1 identifies, and is used to execute, test cases 31117 and 31118. Generally speaking, test cases are executed by automated testing software 111 by comparing expected results stored in expected results database 121 with actual results stored in actual results database 132. In the example discussed below, various fields of actual results spreadsheet 134 are compared to the expected results in expected results database 121, to verify that software application 131 accurately populated the fields of actual results spreadsheet 134 in accordance with each verification point.

At step S204, automated testing software 111 begins executing the first test case, 31117, by extracting data from expected results database 121 and actual results database 132. Software application 131 may be responsible for populating a "text" column of actual results spreadsheet 134 with certain text data, for example, the letters "A," "B," or "C." Control file 114-1 may include an actual data identifier 602, which specifies which cells in the spreadsheet are being tested by test case 31117. Control file 114-1 may also include a SQL query 601, which extracts the corresponding expected results for test case 31117 from expected results database 121.

SQL query 601 may include SQL commands identifying the location of db_text in expected results database 121. Furthermore, SQL query 601 may include SQL commands for organizing and preparing data in expected results database 121 before continuing with method 200. In some embodiments, SQL query 601 may also include logic for emulating the expected functionality of software application 131, such as by filtering the data or applying formulae to the data.

At step S205, automated testing software 111 may compare the actual data and expected data retrieved at step S204. For example, automated testing software 111 may determine that test case 31117 has "passed" if the data in the text column of actual results spreadsheet 134 matches the value extracted from expected results database 121, db_text, which may be an array of characters including "A, B, C, A, B, C." Thus, when the text column of actual results spreadsheet 134 matches each value of db_text, test case 31117 is determined to have passed. In the case of numerical values, control file 114-1 may specify an optional tolerance, e.g. 0.01, and the test case is determined to have passed if the actual value is within the specified tolerance of the expected value.

Next, in decision block D201, it is determined if control file 114-1 includes more test cases. If control file 114-1 does not include more test cases, method 200 moves to step S206. Otherwise, method 200 returns to step S204, to execute the next test case. In our example, control file 114-1 indicates a second test case, 31118, so method 200 returns to step S204 and extracts actual and expected data for test case 31118. For example, automated testing software 111 may extract the value db_calendardate from expected results database 121. Automated testing software 111 may also extract a column labeled "Calendar Date" from actual results spreadsheet 134 created by software application 131.

Method 200 again moves to step S204, where automated testing software 111 compares the extracted values. In this case, db_calendardate from expected results database 121 may have a value of 2005-01-10. As shown in FIG. 3, the calendar date column of actual results spreadsheet 134 includes values of 1/10/2005. Although the dates are not formatted identically, automated testing software 111 may include logic to translate between the different date formats and determine that they represent the same date, e.g. Jan. 10, 2005. Next, in step S205, automated testing software 111 determines that test case 31118 has passed because the dates match.

In some embodiments, automated testing software 111 also checks to determine whether the amount of data matches. For example, if actual results spreadsheet 134 includes 20 rows of data, and expected results database 121 includes 21 rows, automated testing software 121 may determine the test case fails even if the data in the 20 rows of actual results spreadsheet 134 matches the first 20 rows of expected results database 121. In some embodiments, automated testing software 111 also checks to ensure that there is at least one data item in the actual results and expected results identified by control file 114-1. If both the actual results and expected results are empty, automated testing software 111 may determine that the test fails, even though the empty data sets "match." Furthermore, automated testing software 111 may check to ensure that blocks 601 and 602 of control file 114-1 are not identical, for example by identifying to the user that there may be a copy and paste error in control file 114-1.

Continuing with our example, all of the test cases in control file 114-1 have been executed, so method 200 moves to step S206. In step S206, automated testing software 111 may generate a result file 700, shown in FIG. 7. Automated testing software 111 may also store result file 700 in a storage device, for example a local memory or hard drive on client 110. Result file 700 may include a number of columns corresponding to test cases 31117 and 31118. Columns corresponding to test case 31117 include text actual column 701, text expected column 702 and text comparison column 703. The text values for each of 6 rows in the spreadsheet output by software application 131 are shown in text actual column 701. The text values in expected results database 121 are shown in text expected column 702. If the values in text actual column 701 match the values in text expected column 702, text comparison column 703 indicates a "pass." Otherwise, text comparison column 703 indicates "fail." Similarly, columns 704-706 indicate whether the "Calendar Date" column of the spreadsheet match the expected values.

Next, in decision block D202, it is determined whether configuration file 114-1 identifies additional control files 114 that have yet to be executed. Otherwise, method 200 moves to step S207.

In the present example, configuration file 114-1 identifies a single control file, e.g. config1.ctl, so method 200 moves to step S207. In step S207, test report generator 112 creates a summary report 800, shown in FIG. 8. In test case column 801, summary report 800 may include a list of all test cases executed by method 200. In test result file name column 802, summary report 800 may include a list of hyperlinks to result files, such as result file 800. In test result creation time column 803, summary report 800 may include a timestamp indicating the time at which the result files in column 802 were initially created. In detail column 804, summary report 800 may include text identifying the verification point or points corresponding to a given test case. In some embodiments, automated testing software 111 may extract the text from description column 403 of test case list file 115-1 by matching each test case ID to the corresponding description.

Next, method 200 moves to step S208, where automated testing software 111 provides summary report 800 to the user. For example, automated testing software may display summary report 800 in a web browser, so that the user may click the hyperlinks in test result file column 802 and view results file 700. In embodiments where automated testing software 111 is located remotely from the user, step S208 may include transmitting summary report 800 to client 110, or another device operated by the user.

One skilled in the art will appreciate that certain steps of method 200 may be reordered, omitted, added, or performed in a different order than disclosed herein. As an example, step S201 may be performed after one or more of steps S202-S206. In step S207, automated testing software 111 may still generate summary report 800, as long as there is some mapping between test cases/verification ID's and a text description, for example test case list file 115-1.

In the example discussed above, test case ID's 31117 and 31118 each corresponded to a single verification ID, e.g. Verification1 and Verification2, respectively. However, automated testing software 111 also supports cases where a given test case ID corresponds to multiple verification IDs. For example, as shown in FIG. 4, test case ID 31121 corresponds to both Verification4 and Verification5. This may reflect a situation where multiple verification points in a particular engineering document can be demonstrated by a single test case. For example, Verification4 requires that a particular field (not shown) of actual results spreadsheet 134 is equal to a value dbvalue4, and Verification5 requires that the same field is less than 1,000,000. Both of these verification points can be demonstrated if the field of the spreadsheet matches the expected value in the database, because the known good results in expected results database 121 must comply with both verification points.

Conversely, several test case IDs can correspond to one verification point. As shown in FIG. 4, test case IDs 31119 and 31120 both correspond to Verification3, which requires that particular field (not shown) of actual results spreadsheet 134 matches a value dbvalue3 from expected results database 121. For example, dbvalue3 may include both a constant term (K) and a variable value (Z). Test case 31119 may verify that a constant term in the cell of actual results spreadsheet 134 matches K, and test case 31120 may verify that a variable term in the cell of actual results spreadsheet 134 matches Z.

These flexible mappings between test cases or verification points and results files are useful from the perspective of a user responsible for testing software application 111. For example, the user may have an engineering document specifying many different verification points. Some of the verification points will be easily mapped to a single comparison between expected results database 121 and actual results spreadsheet 134. However, in cases where multiple verification points can be proven by a single comparison, the user has the flexibility to map many verification points to a single test case. Likewise, if a large number of comparisons are required to prove a single verification point, the user can develop a number of test cases and map these to the single verification point.

Figure 7:
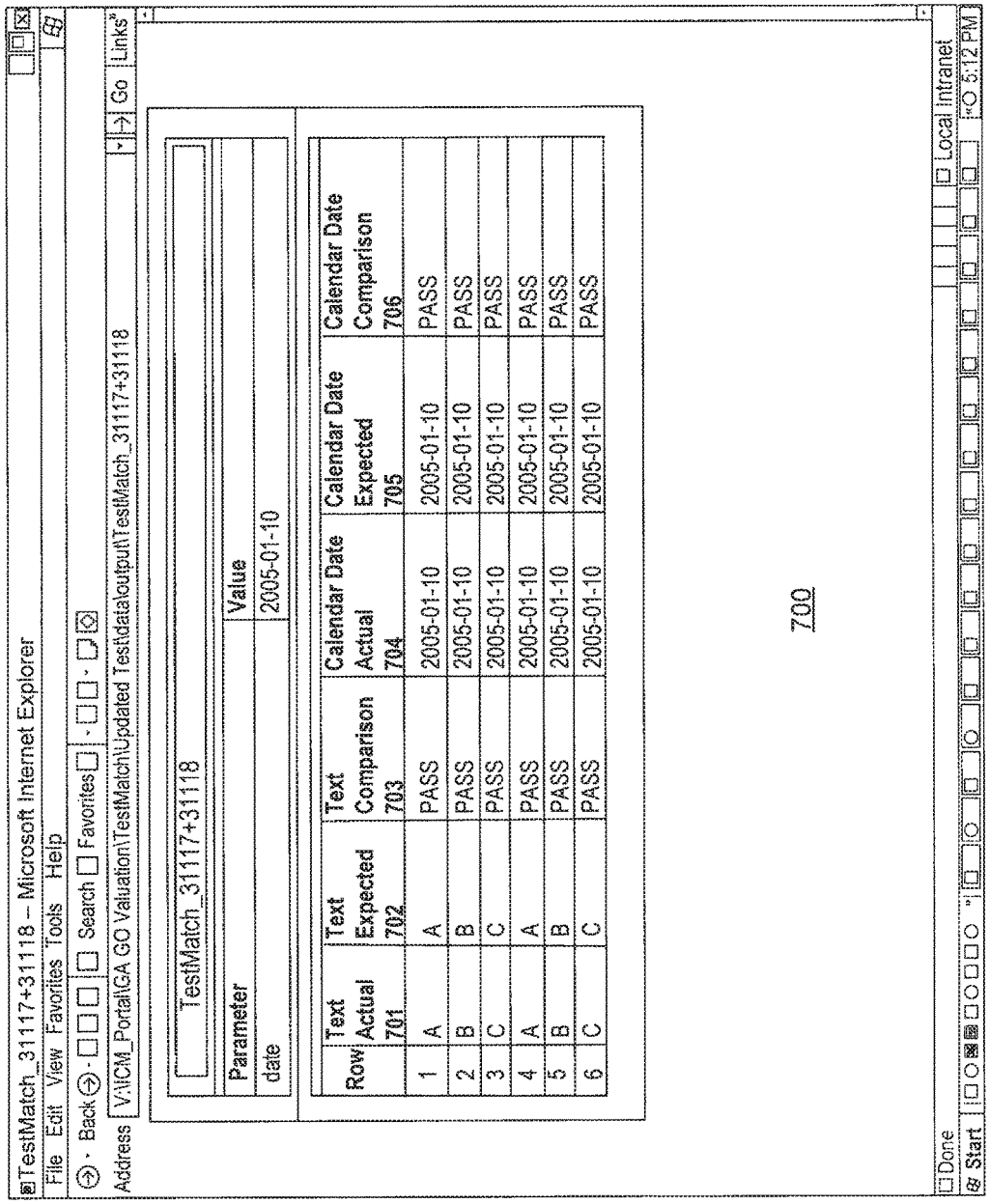
FIG. 7 illustrates an exemplary report, consistent with certain embodiments of the invention.

As shown in FIG. 7, and as discussed above, results for two test cases, e.g. 31117 and 31118, may be combined into one results file 700 at step S206 of method 200. However, in some embodiments, each test case may correspond to a single results file. In such embodiments, automated testing software 111 may generate two results files, one result file for test case 31117 and one result file for test case 31118. Columns 701-703 may appear in a first results file for test case 31117, and columns 704-706 may appear in a second results file for test case 31118.

Automated testing software 111 may employ a naming convention for results files that associates the test cases with the corresponding result files. For example, as shown in FIG. 8, automated testing software 111 generates the string "31117+31118.20080619.103404 PASS.html" as the name for the results file corresponding to control file 114-1, e.g. results file 700. The file name includes the prefix "31117+31118," which represents the two test cases that were used to generate results file 700. The plus "+" character is used to concatenate each individual test case that was used to generate the results file.

In some embodiments, a dash character "-" can be used in place of the plus "+" character. In such embodiments, the dash character is used to reflect a range of test cases, e.g. "31117-31120" as a prefix for a results file indicates the results file includes results for test cases 31117, 31118, 31119, and 31120. This feature may be particularly convenient when a large number of consecutive test cases are used to generate a single result file.

In some embodiments, control file 114-1 uses a similar naming convention for identifying which test cases should be executed. As shown in FIG. 6, control file 114-1 includes a variable "testcase" that indicates the test cases that should be executed by automated testing software 111. Users may identify the test cases for execution by appending a plus "+" character between each test case. Users may identify a range of test cases for execution by appending a dash character between the lowest test case number and highest test case number in the range.

The plus "+" and dash "-" characters used in the naming convention described above can be used together in the same string, either for naming a results file or in a control file. For example, a user could enter "testcase=31117-31120+31123" in control file 114-1, and automated testing software 111 would execute test cases 31117, 31118, 31119, 31120, and 31123, e.g. by performing steps S205 and S206 of method 200 for each of these test cases. Automated testing software 111 would then generate a results file with the prefix "31117-31120+31123" that includes the results for each of the above-noted test cases.

Automated testing software 111 may also include additional information in the file names for the results files. For example, as shown in FIG. 8, each results file name may include the word "PASS" indicating that the test case had a passing result. For a failed test case, the word "FAIL" may be included instead of the word "PASS." Similarly, if the test case does not fail but generates a warning, the word "WARNING" may be used in the file name. For example, if automated testing software 111 determines that one or more cells of actual results spreadsheet 134 do not match a key defined in control file 114-1, for example by finding a blank row, the test case may generate a warning. Automated testing software 111 may generate a warning in this circumstance because it may not be clear whether the blank row is intentional, or represents bad data.

Using this convention, users can easily identify whether a particular test case passed or failed simply by reading the file name. In embodiments where multiple test cases are mapped to a single result file, the result file name may indicate a PASS if all the test cases pass. However, if even a single comparison of the test case fails and other comparisons or test cases pass, the result file name may indicate a FAIL.

In some embodiments, the naming convention also identifies certain components of software application 131 by using a prefix followed by an underscore "_" in the name of the results file. For example, software application 131 may include a "TestMatch" component. As shown in FIG. 7, the string "TestMatch" appears in the prefix of the name of results file 700.

At step S207 of method 200, test report generator 112 may generate a number of other reports in addition to summary report 800. For example, as shown in FIG. 9A, test report generator 112 may generate a list of unexecuted test cases 900. Test report generator 112 may use the naming convention described above to determine which test cases are unexecuted or have no corresponding results file. For example, test report generator 112 may identify each test case listed in test case list file 115-1. Test report generator 112 may then search a directory of results files to determine whether there are results files for each test case. Test report generator 112 may then generate a list of unexecuted test cases 900 by determining which test cases in test case list file 115-1 do not have a corresponding results file. In some embodiments, automated testing software 111 does not actually generate the results files. Instead, for example, software application 131 or another application may generate the results files, and automated testing software 111 provides reports based on these results files, for example by performing step S207 of method 200.

In the example shown, a total of 7 test cases, 31117-31123, are shown in test case list file 115-1. Summary report 800 shows results files for test cases 31117-31121, but not test cases 31122 and 31123. This indicates that test cases 31122 and 31123 are unexecuted, and there are no corresponding results files in the results file directory. For this reason, test cases 31122 and 31123 are reported by test report generator 112 as unexecuted in listing of unexecuted test cases 900.

Test report generator 112 may also generate a test result summary 950, as shown in FIG. 9B. Test result summary 950 may include summaries of the results of all test cases for software application 131. For example, test report summary 950 may indicate the total number of test cases for software application 131 (1744), the total number of passed test cases (54), the total number of failed test cases and/or test cases with a warning (2), and the total number of unexecuted test cases (1685).

Test result summary 950 may also summarize the result files for software application 131. As shown in FIG. 9B, test result summary 950 indicates the total number of result files (85), the total number of result files with the word PASS in the file name (85), the total number of result files with the word FAIL or WARNING in the file name (5), and any misnamed or unknown/unrecognized file names (25). For instance, misnamed/unknown files may reflect files that are found in the results file directory but do not include a test case number indicated by test case list file 115-1. As another example, misnamed/unknown files may reflect files that do not map to a known test case.

As shown in FIG. 10, automated testing software 111 may also generate a spreadsheet output report 1000. Spreadsheet output report 1000 may be formatted based on actual results spreadsheet 134. For example, spreadsheet output report 1000 may include "text" and "calendar date" columns that correspond to the "text" and "calendar date" columns of actual results spreadsheet 134. Spreadsheet output report 1000 may indicate both the actual and expected results for each cell in actual results spreadsheet 134. Spreadsheet output report 1000 may also indicate whether each cell corresponds to a PASS or FAIL result. In some embodiments, each cell is color-coded to identify whether the cell passed or failed. For example, green text may be used to indicate a PASS, and red text may be used to indicate a FAIL.

The various reporting features discussed above may be particularly useful for auditing purposes. For example, if an audit is performed to verify that software application 111 meets certain requirements or passes certain verification points, summary report 800 may simplify the auditing process. An auditor can simply view summary report 800 and see which test cases have passed and which test cases have failed. Because summary report 800 includes a detail field listing each verification point or requirement corresponding to each test case, the auditor can also discern which verification points and/or requirements have been successfully demonstrated to work during testing. Moreover, the auditor can browse directly to the corresponding results file 700 to see the actual and expected data results for each verification point/requirement.

As discussed above, control file 114-1 may include variables that are defined to have certain values. In some embodiments, configuration file 113-1 may be used to set global values for the variables. For example, as shown in FIG. 5, a variable "date" is set equal to "2005-01-10." Control file 114-1 includes a variable '@date' which takes the value of "date" set in configuration file 113-1. In embodiments where several control files are used to execute a test, this technique absolves the user of having to enter "2005-01-10" into all of the control files. Instead, the user can simply make one change to configuration file 113-1, and in step S204 of method 200, automated testing software 111 will interpret each instance of '@date' in the control files to the value of "date" in configuration file 113-1.

Configuration file 114-1 also includes a number of variables that are used to define paths for various data used in method 200. For example, configuration file 113-1 may specify the location where automated testing software 111 is stored ("prog.dir"), the location where the control files are stored ("ctl.dir"), a path to expected results database 121 ("sql.dir"), and a path to a directory where log files may be stored ("log.dir"). Further, configuration file 113-1 may specify where actual results 132-134 are located ("data.dir"), where test input data 141 is stored ("input.dir"), and where results files should be stored ("output.dir"). In some embodiments, automated testing software 111 executes every control file in the input.dir directory. In further embodiments, automated testing software 111 executes every control file in the input.dir directory, as well as every control file in the directory tree underneath input.dir.

In some embodiments, configuration file 114-1 supports a regular-expression syntax for specifying control files that should be executed by automated testing software 111. For example, a wild card character "*" can be used in defining the "testcases" variable shown in FIG. 5, e.g.

"testcases=config*.ctl." In such embodiments, automated testing software 111 may execute all control files 114 on client 110 that include the string "config" followed by the string ".ctl."

Control file 114-1 may also include text defining certain steps that should be taken to prepare data for testing. For example, control file 114-1 may refer to one or more files that include SQL commands for deleting, creating, or modifying data tables in expected results database 121. In such embodiments, these data preparation steps may be implemented by automated testing software 111 before extracting data in step S205 of method 200.

As discussed above, control file 114-1 may reference spreadsheet cells by identifying the column and row location of the data being tested in actual results spreadsheet 134. In some embodiments, control file 114-1 includes a "key" that is used to identify the location of the data to be tested. For example, a key defining the text string "Calendar Date" can be used to identify the "Calendar Date" column of Actual Results Spreadsheet 134.

In such embodiments, automated testing software 111 is less sensitive to changes in the format of actual results spreadsheet 134. For example, if control file 114-1 identifies the third column of actual results spreadsheet 134 to test the "Calendar Date" column, control file 114-1 will work properly with actual results spreadsheet 134 as shown in FIG. 3, because "Calendar Date" is the third column. However, if the developer of software application 131 updates the application to put the "Calendar Date" column in the second column of the spreadsheet, control file 114-1 will no longer identify the proper column. However, if control file 114-1 includes a key identifying the "Calendar Date" column, automated testing software 111 may search for the key "Calendar Date" in the columns of the updated spreadsheet, and find the "Calendar Date" column in the third column.

As an example, the key for the "Calendar Date" column may simply be the string "Calendar Date." However, in some embodiments, regular expressions are used to define keys. For example, the key used to identify the "Calendar Date" column could be the regular expression "date*", which matches any column name that includes the string "date."

In some embodiments, automated testing software includes logic for analyzing spreadsheet functions. Actual results spreadsheet 134 may include a function defining one cell to include the sum of a particular column. Expected results database 121 may not include the sum itself, but may include each of the values in the column that are to be added together. In such embodiments, automated testing software 111 may extract an identifier of the sum function from actual results spreadsheet 134. Automated testing software 111 may include a corresponding addition function, and use the addition function on the corresponding column data in expected results database 121 to generate an expected sum. Automated testing software 111 may then compare the calculated sum to the sum included in actual results spreadsheet 134, to determine if the sums match and the result is a pass or a fail.

As discussed above and shown in FIG. 1, software application 131 may output results in file formats other than a spreadsheet. For example, software application 131 may output data to populate a relational database, such as actual results database 132. In such embodiments, actual data identifier 602 may include SQL code for extracting actual results for comparison with expected results database 121.

Software application 131 may also output text data as ASCII text, comma-separated values ("CSV"), or XML data, such as actual results text file 133. In such embodiments, actual data identifier 602 may include data identifying the locations in actual results text file 133 of the data being tested. Likewise, expected results can be in spreadsheet, ASCII text, CSV, or XML formats. In such embodiments, SQL query 601 is replaced in control file 114-1 with an identifier of the expected data used for comparison. In the case of XML data, third-party tools may be employed using a regular-expression like syntax to identify actual data. For spreadsheet data, third party tools may provide an interface and/or syntax for identifying particular data within the spreadsheet.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or data processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as spreadsheet or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method, performed by a processor connected to a network interface and a networked database, for testing a software application, the method comprising:

extracting, using the processor through the network interface from the networked database, a first expected result of a software application, the first expected result being identified by a control file indicating an expected result verification point of a test case for testing the software application and being generated by SQL query including logic for emulating the expected functionality of the software application to generate known good results;

extracting, using the processor through the network interface from the networked database, a first actual result output by the software application, the first actual result being identified by the control file indicating an actual result verification point of the test case for testing the software application;

comparing, using the processor, the first expected result with the first actual result and the expected result verification point with the actual result verification point to determine whether the first actual result matches the first expected result and whether the expected result verification point matches the actual result verification point;

generating, using the processor, a result file indicating whether the test case passed or failed, the test case having passed when the first actual result matches the first expected result and the expected result verification point matches the actual result verification point;

determining, using the processor, if the generated result file indicates that the test case passed, whether the first expected result and the first actual result contains the same amount of data;

determining, using the processor, if the generated result file indicates that the test case passed, whether the test case ID of the expected result verification point matches the test case ID of the actual result verification point;

updating, using the processor through the network interface, the result file to indicate that the test case failed if the first expected result and the first actual result do not contain the same amount of data; and updating, using the processor through the network interface, the result file to indicate that the test case passed if the test case ID of the expected result verification point matches the test case ID of the actual result verification point.

2. The method according to claim 1, wherein the control file identifies a plurality of test cases, and a single result file is generated to indicate the results of the plurality of test cases.

3. The method according to claim 1, wherein the control file includes an expected data identifier comprising at least one statement for extracting the first expected result from an expected results database.

4. The method according to claim 1, wherein the control file includes an actual data identifier comprising at least one statement for extracting the first actual result.

5. The method according to claim 1, further comprising:
storing a test case list file identifying a plurality of test cases including the test case identified by the control file and mapping the test case to a description of a test case verification point or requirement; and
generating a report including the test case, whether the test case passed or failed, and the description of the test case verification point or requirement.

6. The method according to claim 1, further comprising:
storing, using the processor through the network interface, the result file in a storage device connected to the networked database.

7. The method according to claim 1, wherein the control file specifies a tolerance, and comparing the first expected result with the first actual result comprises determining whether the first actual result is within the specified tolerance of the first expected result.

8. A non-transitory computer-readable medium comprising instructions for causing a processor connected to a network interface and a networked database to execute a method for testing a software application, the method comprising:

extracting, using the processor through the network interface from the networked database, a first expected result of a software application, the first expected result being identified by a control file indicating an expected result verification point of a test case for testing the software application and being generated by SQL query including logic for emulating the expected functionality of the software application to generate known good results;

extracting, using the processor through the network interface from the networked database, a first actual result output by the software application, the first actual result being identified by the control file indicating an actual result verification point of the test case for testing the software application;

comparing, using the processor, the first expected result with the first actual result and the expected result verification point with the actual result verification point to determine whether the first actual result matches the first expected result and whether the expected result verification point matches the actual result verification point;

generating, using the processor, a result file indicating whether the test case passed or failed, the test case having passed when the first actual result matches the first expected result and the expected result verification point matches the actual result verification point;

determining, using the processor, if the generated result file indicates that the test case passed, whether the first expected result and the first actual result contains the same amount of data;

determining, using the processor, if the generated result file indicates that the test case passed, whether the test case ID of the expected result verification point matches the test case ID of the actual result verification point;

updating, using the processor through the network interface, the result file to indicate that the test case failed if the first expected result and the first actual result do not contain the same amount of data; and updating, using the processor through the network interface, the result file to indicate that the test case passed if the test case ID of the expected result verification point matches the test case ID of the actual result verification point.

9. The non-transitory computer-readable medium according to claim 8, wherein the control file identifies a plurality of test cases, and a single result file is generated to indicate the results of the plurality of test cases.

10. The non-transitory computer-readable medium according to claim 8, wherein the control file includes an expected data identifier comprising at least one statement for extracting the first expected result from an expected results database.

11. The non-transitory computer-readable medium according to claim 8, wherein the control file includes an actual data identifier comprising at least one statement for extracting the first actual result.

12. The non-transitory computer-readable medium according to claim 8, the method further comprising:
storing a test case list file identifying a plurality of test cases including the test case identified by the control file and mapping the test case to a description of a test case verification point or requirement; and generating a report including the test case, whether the test case passed or failed, and the description of the test case verification point or requirement.

13. The non-transitory computer-readable medium according to claim 8, the method further comprising:

storing, using the processor through the network interface, the result file in a storage device connected to the networked database.

14. The non-transitory computer-readable medium according to claim 8, wherein the control file specifies a tolerance, and comparing the first expected result with the first actual result comprises determining whether the first actual result is within the specified tolerance of the first expected result.

15. A system for testing a software application, the system comprising:

a processor having access to a networked database;

a network interface in communication with the processor; and a memory device in communication with the processor and configured to store instructions, wherein, when the processor executes the instructions, the processor:

extracts, through the network interface from the networked database, a first expected result of a software application, the first expected result being identified by a control file indicating an expected result verification point of a test case for testing the software application and being generated by SQL query including logic for emulating the expected functionality of the software application to generate known good results;

extracts, through the network interface from the networked database, a first actual result output by the software application, the first actual result being identified by the control file indicating an actual result verification point of the test case for testing the software application;

compares the first expected result with the first actual result and the expected result verification point with the actual result verification point to determine whether the first actual result matches the first expected result and whether the expected result verification point matches the actual result verification point;

generates a result file indicating whether the test case passed or failed, the test case having passed when the first actual result matches the first expected result and the expected result verification point matches the actual result verification point;

determines, if the generated result file indicates that the test case passed, whether the first expected result and the first actual result contains the same amount of data;

determines, if the generated result file indicates that the test case passed, whether the test case ID of the expected result verification point matches the test case ID of the actual result verification point;

updating, using the processor through the network interface, the result file to indicate that the test case failed if the first expected result and the first actual result do not contain the same amount of data; and updating, using the processor through the network interface, the result file to indicate that the test case passed if the test case ID of the expected result verification point matches the test case ID of the actual result verification point.

16. The system according to claim 15, wherein the control file identifies a plurality of test cases, and a single result file is generated to indicate the results of the plurality of test cases.

17. The system according to claim 15, wherein the control file includes an expected data identifier comprising at least one statement for extracting the first expected result from an expected results database.

18. The system according to claim 15, wherein the control file includes an actual data identifier comprising at least one statement for extracting the first actual result.

19. The system according to claim 15, wherein the processor further executes the instructions to:

store a test case list file identifying a plurality of test cases including the test case identified by the control file and mapping the test case to a description of a test case verification point or requirement; and generate a report including the test case, whether the test case passed or failed, and the description of the test case verification point or requirement.

20. The system according to claim 15, wherein the processor further executes the instructions to:

store, through the network interface, the result file in a storage device connected to the networked database.

21. The system according to claim 15, wherein the control file specifies a tolerance, and comparing the first expected result with the first actual result comprises determining whether the first actual result is within the specified tolerance of the first expected result.

* * * * *